United States Patent [19]

Hales et al.

[11] 4,296,602
[45] Oct. 27, 1981

[54] APPARATUS FOR EXTRACTING ENERGY FROM WATER WAVES

[76] Inventors: Marwood J. Hales, Box 116, Redmond, Utah 84652; Cameron L. Thorpe, Axtell, Utah 84621

[21] Appl. No.: 110,932

[22] Filed: Jan. 10, 1980

[51] Int. Cl.³ ............................................. F03B 13/12
[52] U.S. Cl. ....................................... 60/398; 60/639; 415/92; 415/182
[58] Field of Search ................. 60/495, 496, 497, 639, 60/398; 415/92, 182; 290/53, 54

[56] References Cited

U.S. PATENT DOCUMENTS

| | | | |
|---|---|---|---|
| 1,811,565 | 6/1931 | Schwabacher | 60/698 X |
| 3,391,903 | 7/1968 | Peterson, Jr. | 60/398 X |
| 3,746,875 | 7/1973 | Donatelli | 290/54 X |

Primary Examiner—Allen M. Ostrager
Attorney, Agent, or Firm—Mallinckrodt & Mallinckrodt

[57] ABSTRACT

Apparatus for extracting energy from water waves includes an elongate water wheel mounted rotatably so that at least a portion of the wheel is above the level of the water, and a ramp extending substantially the length of the wheel to shield the wave side of the wheel from wave impact and to direct water of the wave upwardly over the top of the wheel so as to impact the water wheel on the side thereof removed from the wave and effect rotation thereof. A holding tank is preferably provided at the top of the ramp and above the wheel to hold water from the waves and to direct it onto the wheel. Energy may be extracted from the rotating wheel by a generator or other device.

11 Claims, 6 Drawing Figures

APPARATUS FOR EXTRACTING ENERGY FROM WATER WAVES

BACKGROUND OF THE INVENTION

1. Field:

The invention is in the field of apparatus for obtaining power from waves of the ocean or other bodies of water.

2. State of the Art:

With the present petroleum shortage, it is becoming more important to tap energy sources other than petroleum in order to meet our growing energy needs. The ocean with its powerful wave and tide movements offers a vast untapped source of energy.

Many attempts have been made to harness the energy of water waves by water-wheel devices, such as by the positioning of water wheels directly into the path of the waves. Such attempts are generally inefficient because of the intermittent nature of waves. They buffet the wheel and prevent efficient motivation thereof. Moreover, no provisions are made to utilize both the kinetic and the elevational energy of the waves. Further, known systems ordinarily make no provisions for adjusting the position of the wheel in accordance with variations in the general level of the body of water, such as often occur seasonally from tides. Therefore, they tend to be intermittent in their operation. Such intermittent operation does not provide the reliable and constant energy output needed.

SUMMARY OF THE INVENTION

According to the invention, efficient and continuous energy generation may be obtained from wave movement by an elongate water wheel adapted to be partially submerged and anchored in a body of water, and by a ramp provided to direct the incoming waves to the top of the wheel so that the water of each wave acts on the upper portion of the wheel. The ramp also protects the wheel from brutal buffeting by the waves. To more efficiently capture the kinetic energy of the waves and to make the system operate continuously, a water-holding tank is disposed above the wheel to capture and store the ramp-directed water of the wave. The holding tank is provided with bottom openings configured and located to release the water upon the vanes of the wheel so as to efficiently impel the wheel. The tank is preferably sized so as to efficiently capture the water of prevailing waves and may be disposed at an elevation appropriate to efficiently transform the kinetic energy of the waves into potential elevational energy in the tank. The tank outlet is sized and disposed to release the water at rates and locations upon the vanes consistent with efficient power generation.

To further increase efficiency, the buoyancy of the wheel may be adjusted so that such wheel, the ramp, and the tank are elevated with respect to the water level for most advantageous performance, and the wheel, tank, and ramp are mounted so as to float with changes in the level of the body of the water.

A massive foundation is provided, which assures stability of the device. Also, outwardly diverging walls are provided to direct the waves to the ramp and thence to the tank. The foundation is configured to direct outward undercurrent against the vanes at the bottom of the wheel for enhancing power generating capabilities of such waves. Also, the foundation preferably carries an additional pair of walls for gathering and directing the undercurrent to the lower vanes of the wheel.

Suitably geared, power transmission means are provided for connecting the rotating shaft of the water wheel with a generator or other power utilization device. Alternately, a circumferential gear may be provided on the shell of the wheel for power take-off purposes.

THE DRAWINGS

In the drawings, which illustrate the best mode presently contemplated for carrying out the invention:

FIG. 1 is a top plan view of the apparatus as installed in a body of water, portions being broken away for convenience of illustration;

FIG. 2, a transverse vertical section taken on the line 2—2 of FIG. 1 and drawn to a somewhat larger scale;

FIG. 3, a fragmentary, longitudinal, vertical section taken on the line 3—3 of FIG. 2;

FIG. 4, a view similar to that of FIG. 2, but showing a different embodiment of power take-off for the water wheel;

FIG. 5, a fragmentary, longitudinal, vertical section taken on the line 5—5 of FIG. 4; and FIG. 6, a top plan view drawn to a considerably smaller scale to show how several units can be installed side-by-side in a series arrangement.

DETAILED DESCRIPTION OF THE ILLUSTRATED EMBODIMENT

Figure 1:
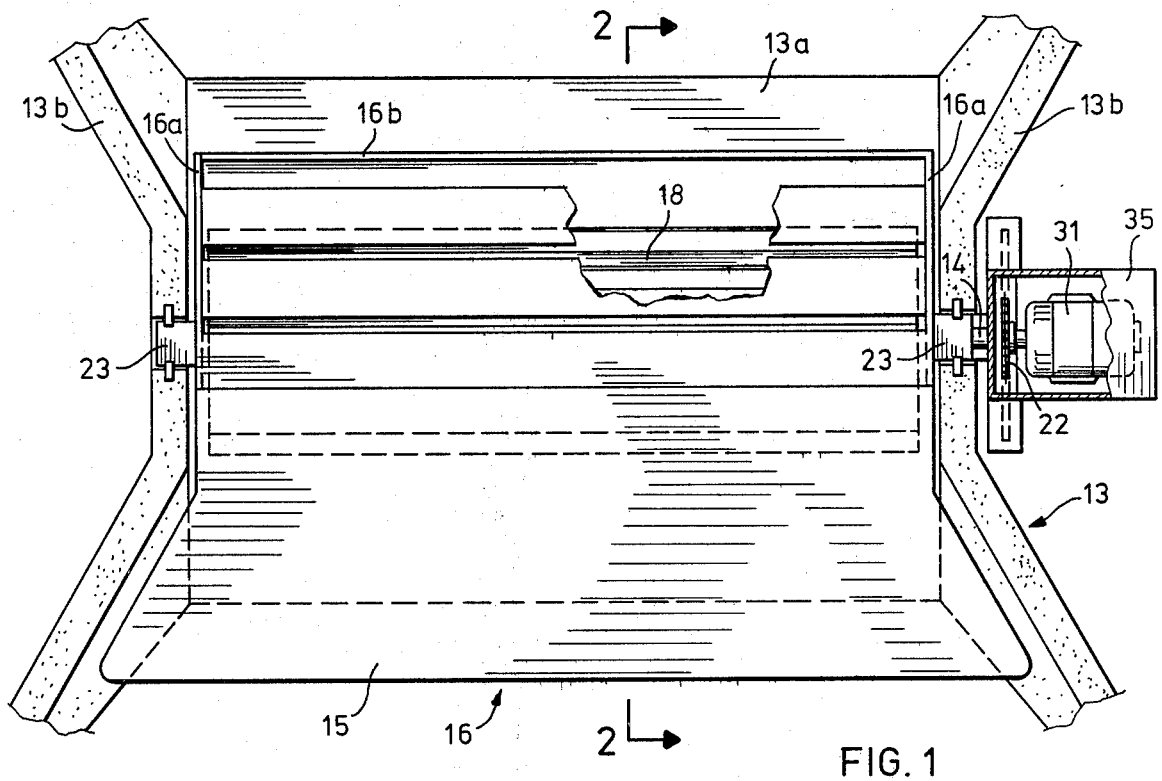
Figure 2:
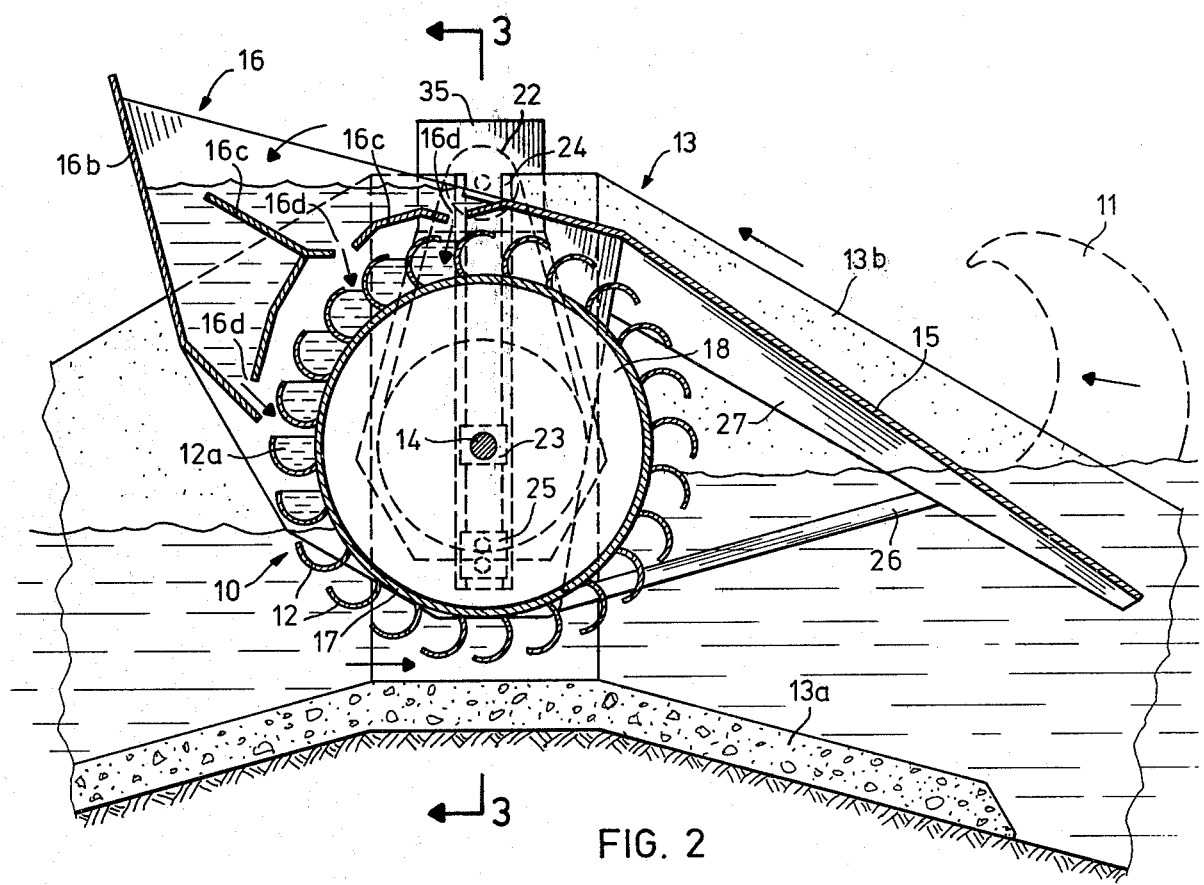
Figure 3:
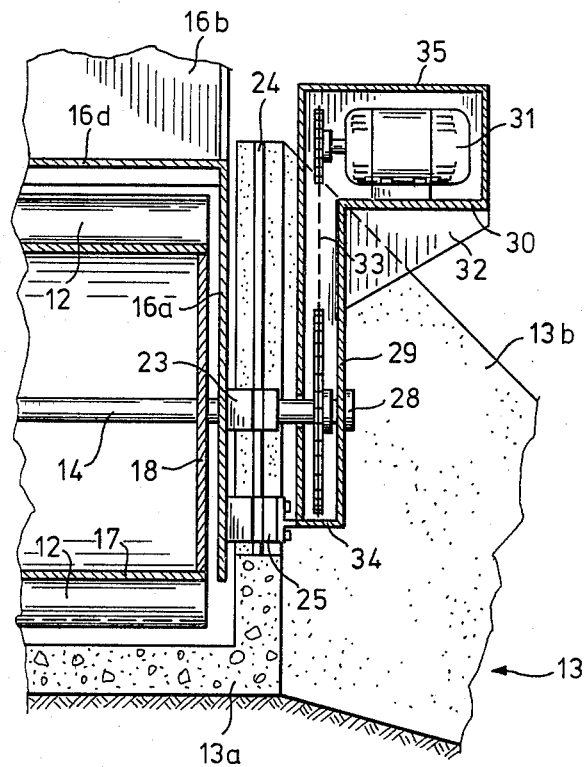

In the presently preferred form illustrated, an elongate water wheel 10 is rotatably mounted in stationary supporting structure 11 so that the water wheel is anchored, for example, in ocean surf and is partially submerged, see FIG. 2.

Water wheel 10 is adapted to be turned by incoming waves, here indicated at 11, and is of typical water-wheel formation. As shown, it includes a circumferential series of preferably curved vanes 12 extending along its length.

Supporting structure 13 includes a concrete foundation pad 13a in the ocean bottom and a pair of upstanding walls 13b, respectively, at opposite ends thereof in which shaft 14 of water wheel 10 is rotatably mounted. The entire water wheel is adapted to float and to rise and fall with the level of the ocean water. A ramp 15, supported with water wheel 10, slopes forwardly and downwardly from above such wheel 10 toward the incoming waves 11. Such ramp 15 thus intercepts the waves and causes water therefrom to be impelled upwardly along the ramp by its own momentum to discharge into and be captured by a water-holding tank 16 which extends substantially the length of the water wheel.

Tank 16 comprises upstanding end plates 16a, an upstanding back plate 16b, and bottom plates 16c, the latter being contoured to generally conform to the curvature of water wheel 10. The bottom plates 16c form elongate, outlet slots 16d through which the captured water flows into concave sides 12a of the vanes 12, to cause the wheel 10 to rotate about its longitudinal axis. The kinetic energy of the incoming wave is thus transformed, first, into potential elevational energy in the tank, and, then, into rotational energy of the water wheel.

Water wheel 10 comprises cylindrical shell 17 closed by ends 18 to form a sealed tank-like structure. Axial shaft 14 is secured to end plates 18. As thus constructed, water wheel 10 is buoyant. Its buoyancy may be varied by varying its weight, which, for example, may be done by partially filling the wheel with water or other ballast. Water wheel 10 thus floats as indicated in FIG. 2 with a portion of the wheel above the surface of the water, and will rise and fall with the water level. A vertically disposed axle bearing slot 22, provided in each support structure wall 13b accommodates variations in the height of water wheel 10. A sealed bearing block 23 is provided on shaft 14 and is adapted to engage and slide on rails 24 in slot 22.

Water-holding tank 16 is adapted to rise and fall with wheel 10 to maintain its relative position with respect thereto. For this purpose each tank end plate 16a is mounted on bearing block 23 so that it is supported by shaft 14 and moves up and down therewith. A block 25 secured to tank end plates 16a is also adapted to slide on rails 24 in slot 22 to keep the tank from rotating. Ramp 15 is secured to the tank 16 and so rises and falls therewith and stays in wave-capturing position. Bracing 26 helps support ramp 15 in proper position, as do ramp side plates 27.

Attached to shaft 14 by bearing 28 is generator support 29, which has a horizontal platform 30 attached thereto upon which generator 31 is secured. Platform 30 is reinforced by plate 32. Generator 31 is driven by a chain drive 33, although other types of drives could be used.

To keep the generator and its supports from rotating about shaft 14, support 29 extends downwardly below shaft 14 and bracket 34, secured thereto, is secured to block 25. A cover 35 extends from bracket 34 up and around chain drive 33 and generator 31. It will be noted that the entire generator assembly will rise and fall along with water wheel 10.

The foundation pad 13a is preferably shaped so that, at least when water wheel 10 is at or near its lowest position, see FIG. 2, the outflow or undercurrent of water impinges upon the vanes at the bottom of the water wheel to help rotate it. This effect will be lesser as the water wheel rises with respect to the bottom pad.

Figure 4:
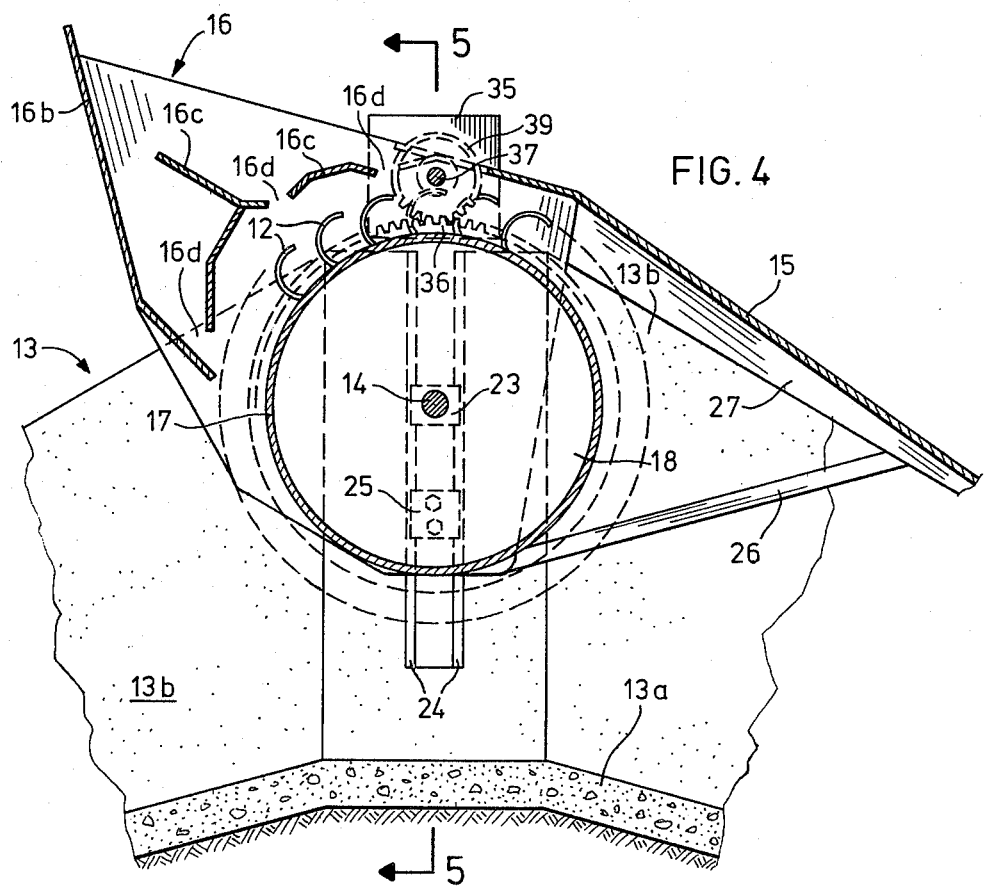
Figure 5:
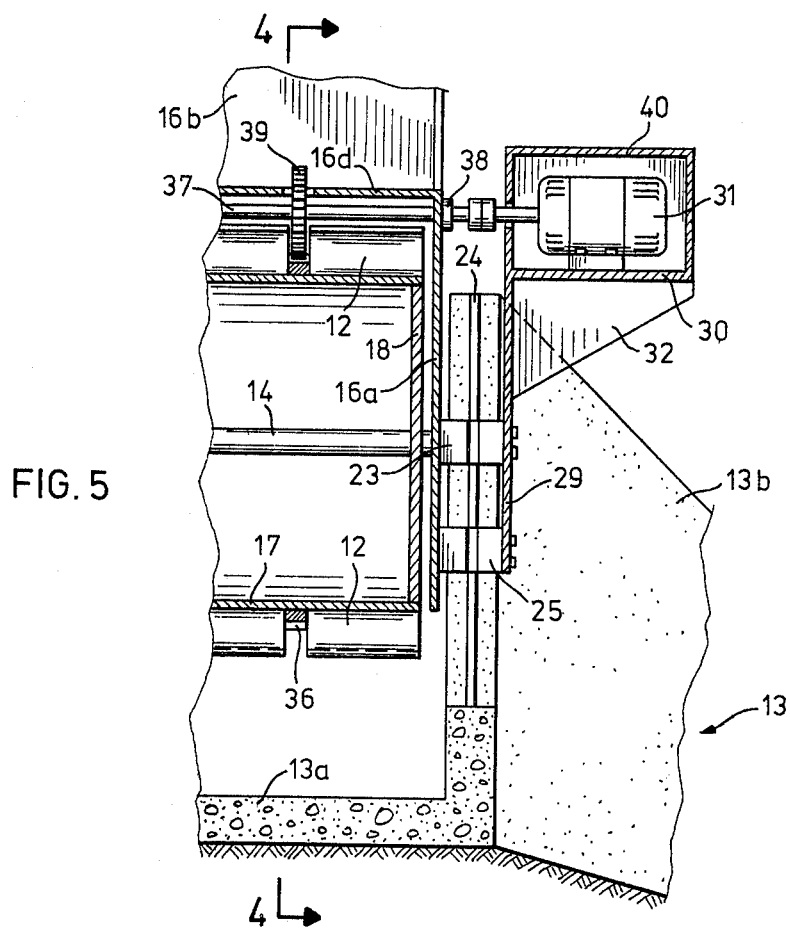

FIGS. 4 and 5 illustrate a different embodiment for taking the rotational energy from water wheel 10. Instead of utilizing the shaft 14 to run the generator, water wheel 10 is provided with one or more gear racks 36 about its circumference. Generator support 29 is mounted on bearing blocks 23, rather than on shaft 14, and is attached to block 25. A shaft 37 is mounted below tank bottom 16d by bearings 38 in tank end walls 16a. Shaft 37 carries gears 39 which mesh with racks 36 so that, as water wheel 10 and racks 36 rotate, gear 39 rotates shaft 37 which is coupled to generator 31. A cover 40 surrounds generator 31.

Figure 6:
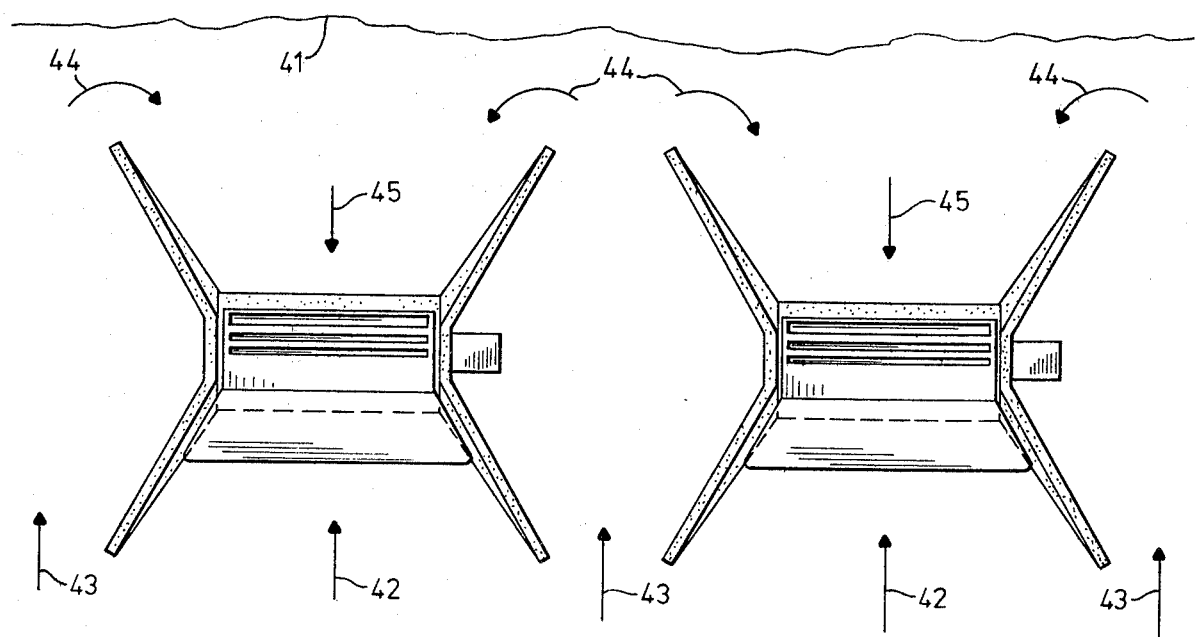

FIG. 6 shows diagrammatically two of the water-wheel devices installed within a body of water near a shore line 41. Arrows 42 indicate incoming waves impinging upon the water-wheel device and being captured by the tank 16 as hereinbefore described. Arrows 43 indicate generally the direction of flow around the water-wheel devices resulting from portions of waves not intercepted. Adjacent unintercepted portions 43 of the waves flow around the device, as indicated by arrows 44, and are reflected from the shore 41 to then flow outwardly from the shore toward the water wheel-device. This outward flow creates an outward undercurrent generally below water wheel 10, indicated by arrows 45, which adds to rotation of water wheel 10 as previously indicated.

The energy extraction capacity of the water-wheel device is further enhanced by the arrangement of supporting structure walls 13b which angle outwardly from opposite ends of water wheel 10 toward incoming waves, so as to gather an increased portion of the wave and direct it toward ramp 15 and thence into tank 16. Similarly, walls 13b on the other side of water wheel 10 also angle outwardly to direct increased portions of undercurrent toward the lower vanes of the wheel to further enhance power extraction.

The size of the water wheel and the height of the water-holding tank above the water wheel and above the surface of the water will vary depending upon the usual size of the waves at the location where the water wheel is located. Thus, where waves are relatively large, the height of the tank above the water level may be greater than where waves are relatively small, and such greater height allows a larger water wheel to be used and allows it to float higher out of the water than otherwise.

The slots in tank 16 and the portions of the tank formed by bottom walls 16d may be arranged in any manner to most efficiently hold and distribute water to water wheel 10.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. Apparatus for extracting energy from water waves, comprising an elongate water-wheel; foundation means rotatably mounting the water wheel and anchoring it to the bottom of a body of water in which waves are produced, so that at least a portion of the wheel is above the surface of said body of water; a ramp extending substantially the length of the wheel, shielding the wave side of the wheel from the wave impact, and directing water of the wave upwardly over the top of the wheel to imapct said water wheel on the side thereof removed from the wave and to effect rotation thereof; and means for extracting energy from the rotation of the wheel.

2. Apparatus according to claim 1, wherein the ramp terminates in a holding tank above the wheel, which stores water directed by the ramp and releases it onto the water wheel.

3. Apparatus according to claim 2, wherein the holding tank includes a plurality of openings therein to direct water onto portions of the water wheel.

4. Apparatus according to claim 3, wherein the holding tank includes a partition dividing it into at least two portions, and wherein there is at least one opening in the bottom of each portion.

5. Apparatus according to claim 1, wherein the water wheel and ramp are mounted to rise and fall with changes in the water level of the body of water in which the apparatus is mounted.

6. Apparatus according to claim 5, wherein the water wheel is buoyant and floats in the water.

7. Apparatus according to claim 6, wherein the foundation means for rotatably mounting the water wheel includes bearing blocks in which the water wheel is rotatably mounted, said bearing blocks being mounted for vertical travel to allow the water wheel to rise and fall with the level of the water.

8. Apparatus according to claim 1, wherein the means for extracting energy from the rotation of the water wheel includes a generator operatively connected to the shaft of the water wheel.

9. Apparatus according to claim 1, wherein the means for extracting energy from the rotation of the water wheel includes at least one gear rack mounted on the circumference of the water wheel; a shaft; a gear mounted on the shaft and mating with the rack so, as the water wheel turns, the gear and shaft turn; and means operatively connecting the shaft and generator.

10. Apparatus according to claim 1, wherein the foundation includes walls that angle outwardly from opposite ends of the water wheel toward the incoming waves to concentrate the waves toward the ramp.

11. Apparatus according to claim 1, wherein the foundation includes walls that angle outwardly from the opposite ends of the water wheel toward the shore to concentrate the undercurrent toward the bottom of the wheel.

* * * * *